US011385450B2

(12) United States Patent
Kwon et al.

(10) Patent No.: US 11,385,450 B2
(45) Date of Patent: Jul. 12, 2022

(54) METASURFACE IMAGER FOR QUANTITATIVE PHASE GRADIENT DETECTION

(71) Applicant: California Institute of Technology, Pasadena, CA (US)

(72) Inventors: Hyounghan Kwon, Pasadena, CA (US); Ehsan Arbabi, Arcadia, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 264 days.

(21) Appl. No.: 16/863,181

(22) Filed: Apr. 30, 2020

(65) Prior Publication Data
US 2020/0348500 A1 Nov. 5, 2020

Related U.S. Application Data

(60) Provisional application No. 62/842,702, filed on May 3, 2019.

(51) Int. Cl.
*G02B 21/00* (2006.01)
*G01J 9/02* (2006.01)
*G02B 1/00* (2006.01)

(52) U.S. Cl.
CPC ............ *G02B 21/0092* (2013.01); *G01J 9/02* (2013.01); *G02B 1/002* (2013.01); *G02B 21/0056* (2013.01); *G01J 2009/0261* (2013.01); *G01J 2009/0269* (2013.01)

(58) Field of Classification Search
CPC .............. G01J 9/02; G01J 2009/0223; G01J 2009/0261; G01J 2009/0269; G02B 1/002; G02B 21/0056; G02B 21/0092; G01B 9/02097; G01B 9/02098; G01B 9/04
See application file for complete search history.

(56) References Cited

U.S. PATENT DOCUMENTS 9,739,918 B2 8/2017 Arbabi et al.
2010/0309457 A1* 12/2010 Cui ...................... G01J 9/0215
356/121
2012/0268809 A1 10/2012 Guo et al.
(Continued)

FOREIGN PATENT DOCUMENTS

WO WO-2016184571 A2 * 11/2016 ............. G01B 11/24
WO 2017/176921 A1 10/2017
(Continued)

OTHER PUBLICATIONS

Aleman-Castaneda, L., et al., "Shearing interferometry via geometric phase," Optica 6, 396-399 (Apr. 2019). 5 Pages.
(Continued)

*Primary Examiner* — Michael A Lyons
(74) *Attorney, Agent, or Firm* — Steinfl + Bruno, LLP

(57) ABSTRACT

Quantitative phase gradient microscopes (QPGM) using metasurface layers including birefringent lenses are disclosed. The birefringent lenses are manufactured by patterning nanoposts on two different transparent substrates or on opposite sides of the same transparent substrate. Methods to generate phase gradient images (PGI) of objects using the described devices are also disclosed.

20 Claims, 24 Drawing Sheets

(56) References Cited

U.S. PATENT DOCUMENTS

| | | | |
|---|---|---|---|
| 2018/0143001 A1 | 5/2018 | Popescu et al. | |
| 2018/0348511 A1 | 12/2018 | Arbabi et al. | |
| 2019/0064532 A1 | 2/2019 | Riley, Jr. et al. | |
| 2019/0113885 A1* | 4/2019 | Arbabi | G03H 1/06 |

FOREIGN PATENT DOCUMENTS

| | | |
|---|---|---|
| WO | 2018/142339 A1 | 8/2018 |
| WO | 2020/227000 A1 | 11/2020 |

OTHER PUBLICATIONS

Alford, R. et al., "Toxicity of organic fluorophores used in molecular imaging: literature review," *Molecular imaging* 8, 341-354 (Nov./Dec. 2009). 15 Pages.

Arbabi, A., et al., "Dielectric metasurfaces for complete control of phase and polarization with subwavelength spatial resolution and high transmission," *Nature nanotechnology* 10, 937-943 (2015). 9 Pages.

Arbabi, A. et al., "Miniature optical planar camera based on a wide-angle metasurface doublet corrected for monochromatic aberrations," *Nature Communications* 7, 13682 (Published Nov. 28, 2016). 10 Pages.

Arbabi, A., et al., "Planar metasurface retroreflector,". *Nature Photonics* 11, 415-420 (Jun. 19, 2017). 8 Pages.

Arbabi, E., et al., "Controlling the sign of chromatic dispersion in diffractive optics with dielectric metasurfaces," *Optica* 4, 625-632 (Jun. 2017). 9 Pges.

Arbabi, E., et al., "Full stokes imaging polarimetry using dielectric metasurfaces." ACS Photonics 5, 3132-3140 (2018).

Arbabi, E. et al. "Mems-tunable dielectric metasurface lens," *Nature communications* 9, 812 (2018). 10 Pages.

Arbabi, E., et al., "Multiwavelength polarization-insensitive lenses based on dielectric metasurfaces with meta-molecules," Optica 3, 628-633 (Jun. 2016). 7 Pages.

Arbabi, E. et al., "Two-photon microscopy with a double-wavelength metasurface objective lens," Nano letters 18, 4943-4948 (2018). 7 Pages.

Avayu, O., et al., "Composite functional metasurfaces for multispectral achromatic optics," *Nature Communications* 8, 14992 (Published Apr. 5, 2017). 8 Pages.

Bianco, V. et al.., "Endowing a plain fluidic chip with micro-optics: a holographic microscope slide," *Light: Science & Applications* 6, e17055 (2017). 13 Pages.

Chen, W. T. et al., "A broadband achromatic metalens for focusing and imaging in the visible," Nature nanotechnology 13, 220-226 (Mar. 2018 l). 9 Pages.

Choi, W. et al. "Tomographic phase microscopy," Nature methods 4, 717-719 (2007). 4 Pages.

Colburn, S., et al., "Metasurface optics for full-color computational imaging," Science Advances 4, eaar2114 (Feb. 9, 2018). 8 Pages.

Colburn, S., et al., "Varifocal zoom imaging with large area focal length adjustable metalenses," Optica 5, 825-831 (2018).

Coutu, D. L., et al., "Probing cellular processes by long-term live imaging-historic problems and current solutions," J. Cell Sci. 126, 3805-3815 (2013). 12 Pages.

Faraji-Dana, M., et al., "Compact folded metasurface spectrometer," *Nature Communications* 9, 4196 (2018). 9 pages.

Genevet, P., et al., "Recent advances in planaroptics: from plasmonicto dielectric metasurfaces," *Optica* 4, 139-152 (Jan. 19, 2017). 15 Pages.

Ghosh, K. K. et al. "Miniaturized integration of a fluorescence microscope," Nature methods 8, 871-878 (Oct. 2011). 13 pages.

Greenbaum, A. et al. "Wide-field computational imaging of pathology slides using lens-free on-chip microscopy," *Science translational medicine* 6, 267ra175(Dec. 17, 2014). 12 pages.

Guo, C., et al., "Photonic crystal slab Laplace operator for image differentiation," *Optica* 5, 251-256 (Feb. 27, 2018). 7 pages.

Helmchen, F., et al., "A miniature head-mounted two-photon microscope: high-resolution brain imaging in freely moving animals," Neuron 31, 903-912 (2001). 11 pages.

Hsiao, H.-H., et al., "Fundamentals and applications of metasurfaces, "*Small Methods* 1, 1600064 (2017). 21 Pages.

Hu, C., et al., "Quantitative phase imaging (qpi) in neuroscience," *IEEE Journal of Selected Topics in Quantum Electronics* 25 (Jan./Feb. 2019). 10 Pages.

Huang, P. S., et al., "Fast three-step phase-shifting algorithm,"Applied optics 45, 5086-509(Jul. 20, 2006). 7 Pages.

International Search Report for PCT App. No. PCT/US2020/030682 Filed on Apr. 30, 2020 on behalf of California Institute of Technology, dated Aug. 20, 2020. 3 Pages.

Jahani, S., et al., "All-dielectric metamaterials," Nature nanotechnology 11, 23-26 (Jan. 2016). 15 Pages.

Kamali, S. M., et al., "A review of dielectric optical metasurfaces for wavefront control," Nanophotonics 7, 1041-1068 (2018). 29 Pages.

Kamali, S. M. et al., "Angle-multiplexed metasurfaces: Encoding independent wavefronts in a single metasurface under different illumination angles," *Physical Review X* 7, 041056(2017). 10 Pages.

Kamali, S. M., et al., "Highly tunable elastic dielectric metasurface lenses.,"*Laser & Photonics Reviews* 10, 1002-1008 (2016). 8 Pages.

Kim, T. et al., "White-light diffraction tomography of unlabelled live cells," Nature Photonics 8, 256-263 (2014). 9 Pages.

Kwon, H., et al., "Computational complex optical field imaging using a designed metasurface diffuser," Optica 5, 924-931 (2018). 9 Pages.

Kwon, H., et al., "Nonlocal metasurfaces for optical signal processing," *Physical review letters* 121, 173004 (2018). 7 Pages.

Kwon, H., et al., "Single-shot quantitative phase gradient microscopy using a system of multifunctional metasurfaces," + Supplementary information, Nature Photonics, vol. 14| Feb. 2020, pp. 109-114, 34 Pages https://doi.org/10.1038/s41566-019-0536-x.

Lalanne, P., et al., "Blazed binary subwavelength gratings with efficiencies larger than those of conventional échelette gratings,"Optics letters 23, 1081-1083 (Jul. 15, 1998). 4 Pages.

Lang, W., et al., "Nomarski differential interference contrast microscopy," (Carl Zeiss, 1982). 9 Pages.

Lee, G.-Y. et al., "Complete amplitude and phase control of light using broadband holographic metasurfaces,"*Nanoscale* 10, 4237-424(2018).

Lee, K. et al., "Quantitative phase imaging techniques for the study of cell pathophysiology: from principles to applications," *Sensors* 13,4170-4191 (2013). 23 Pages.

Lin, D., et al., "Dielectric gradient metasurface optical elements," *science* 345, 298-302 (2014). 7 Pages.

Lin, D. et al., "Photonic multitasking interleaved si nanoantenna phased array,"*Nano letters* 16, 7671-7676 (2016).

Liu, L. et al., "Broadband metasurfaces with simultaneous control of phase and amplitude," *Advanced Materials* 26, 5031-5036 (2014). 7 Pages.

Liu, V., et al., "S4: A free electromagnetic solver for layered periodic structures," *Computer Physics Communications* 183, 2233-2244 (2012). 13 Pages.

Maguid, E. et al. "Photonic spin-controlled multifunctional shared-aperture antenna array," Science aaf3417 (Jun. 3, 2016). 7 Pages.

Marquet, P. et al. "Digital holographic microscopy: a noninvasive contrast imaging technique allowing quantitative visualization o living cells with subwavelength axial accuracy," Optics letters 30, 468-470 (Mar. 1, 2005). 4 Pages.

Nguyen, T. H., et al., "Gradient light interference microscopy for 3d imaging of unlabeled specimens,"*Nature Communications* 8, 210 (2017). 10 Pages.

Paganin, D., et al., "Non-interferometric phase imaging with partially coherent light," Physical review letters 80, 2586-2589 (Mar. 23, 1998). 5 Pages.

Pahlevaninezhad, H. et al., "Nano-optic endoscope for high-resolution optical coherence tomography in vivo,"Nature Photonics 12,540-547 (Sep. 2018). 10 Pages.

Park, Y., et al., "Quantitative phase imaging in biomedicine," NaturePhotonics, 12, 578-589 (Oct. 2018). 13 Pages.

(56) References Cited

OTHER PUBLICATIONS

Rivenson, Y. et al. "Phasestain: the digital staining of label-free quantitative phase microscopy images using deep learning ."Light: Science & Applications 8, 23 (2019). 12 Pages.

She, A., et al., "Adaptive metalenses with simultaneous electrical control offocal length, astigmatism, and shift," Science Advances 4,eaap9957 (2018). 9 Pages.

Shi, Z. et al., "Single-layer metasurface with controliable multiwavelength functions," *Nano letters*18, 2420-2427 (2018). 9 Pages.

Shrestha, S., et al., "Broadband achromatic dielectric metalenses," *Light: Science & Applications*7, 85 (2018). 12 Pages.

Skocek, O. et al., "High-speed volumetric imaging of neuronal activity in freely moving rodents," Nature methods 15, 429-432 (Jun. 2018) 10 Pages.

Sung, J., et al., "Single-layer bifacial metasurface: Full-space visible lightcontrol," *Advanced OpticalMaterials*1801748 (2019). 10 Pages.

Terborg, R. A., et al., "Ultrasensitive interferometric on-chip microscopy of transparent objects," *Science advances*2, e1600077 (Jun. 10, 2016). 9 pages.

Tian, L., et al., "Multiplexed coded illumination for fourier ptychography with an LED array microscope," Biomedical optics express 5,2376-2389 (2014). 15 Pages.

Wang, L. et al., "Grayscale transparent metasurface holograms," Optica3, 1504-1505 (2016). 3 Pages.

Written Opinion for PCT App. No. PCT/US2020/030682 Filed on Apr. 30, 2020 on behalf of California Institute of Technology, dated Aug. 20, 2020. 6 Pages.

Zernike, F., et al., "How I discovered phase contrast," Science 121, 345-349 (1955). 7 Pages.

Zhan, A. et al., "Low-contrast dielectric metasurface optics,"ACS Photonics 3, 209-214 (2016). 7 pages.

Zheng, G., et al., Wide-field, high-resolution fourier ptychographic microscopy, *Nature photonics*7, 739-745 (Jul. 28, 2013). 9 Pages.

Zhou, Y. et al., "Multilayer noninteracting dielectric metasurfaces for multiwavelength metaoptics,"*Nano letters*18, 7529-7537 (Nov. 5, 2018). 10 Pages.

Zhu, A. Y. et al., "Compact aberration-corrected spectrometers in the visible using dispersion-tailored metasurfaces," *Advanced OpticalMaterials*1801144 (2018) 9 pages.

Ziv, Y. et al., "Long-term dynamics of ca1 hippocampal place codes," Nature neuroscience 16, 264-266 (Feb. 10, 2013). 7 Pages.

Zong, W. et al., "Fast high-resolution miniature two-photon microscopy for brain imaging in freely behaving mice," Nature methods 14, 713-719 (Jul. 2017). 11 Pages.

\* cited by examiner

| Metasurface | R ($\mu m$) | $\Delta D$ ($\mu m$) | $\Delta s$ ($\mu m$) | $a_1$ | $a_2$ | $a_3$ | $a_4$ | $a_5$ | $k_{grat,1}$ (rad/$\mu m$) |
|---|---|---|---|---|---|---|---|---|---|
| Layer1 | 300 | 660 | 1.5 | $-4.70 \times 10^2$ | $2.05 \times 10^1$ | $-3.88 \times 10^0$ | $7.69 \times 10^{-1}$ | $-7.30 \times 10^{-2}$ | 2.23 |

| Metasurface | R ($\mu m$) | $\Delta D$ ($\mu m$) | $\Delta s$ ($\mu m$) | $b_1$ | $b_2$ | $b_3$ | $b_4$ | $b_5$ | $k_{grat,2}$ (rad/$\mu m$) |
|---|---|---|---|---|---|---|---|---|---|
| Layer2 | 300 | 660 | 1.5 | $-2.37 \times 10^2$ | $3.58 \times 10^{-1}$ | $1.07 \times 10^1$ | $7.58 \times 10^0$ | $1.92 \times 10^1$ | 2.22 |

| Metasurface | R ($\mu m$) | $\Delta D$ ($\mu m$) | $\Delta s$ ($\mu m$) | $a_1$ | $a_2$ | $a_3$ | $a_4$ | $a_5$ | $k_{grat,1}$ (rad/$\mu m$) |
|---|---|---|---|---|---|---|---|---|---|
| Layer1 | 100 | 210 | 1.5 | $-1.29 \times 10^2$ | $7.96 \times 10^0$ | $-1.117 \times 10^1$ | $6.98 \times 10^0$ | $-1.34 \times 10^0$ | 2.21 |

| Metasurface | R ($\mu m$) | $\Delta D$ ($\mu m$) | $\Delta s$ ($\mu m$) | $b_1$ | $b_2$ | $b_3$ | $b_4$ | $b_5$ | $k_{grat,2}$ (rad/$\mu m$) |
|---|---|---|---|---|---|---|---|---|---|
| Layer2 | 100 | 210 | 1.5 | $-7.88 \times 10^1$ | $-5.19 \times 10^0$ | $4.53 \times 10^0$ | $-1.43 \times 10^0$ | $1.61 \times 10^{-1}$ | 2.19 |

FIG. 5E

METASURFACE IMAGER FOR QUANTITATIVE PHASE GRADIENT DETECTION

CROSS REFERENCE TO RELATED APPLICATIONS

The present application claims priority to U.S. Prov. App. 62/842,702 filed on May 3, 2019, the disclosure of which is incorporated by reference in its entirety in the present application. The present application may be related to U.S. Pat. No. 9,739,918 issued on Aug. 22, 2017 and to US Pub. App. 2018-0348511 published on Dec. 6, 2018, the disclosures of both of which are also incorporated by reference in their entirety in the present application.

FIELD

The present disclosure is related to imagers, and more particularly to metasurface imagers including multifunctional metasurfaces used for quantitative phase gradient detection.

BACKGROUND

Optical phase microscopy techniques have been widely investigated for imaging transparent specimens like cells. For these weakly scattering samples, phase information represents the optical path difference of light passing through the cell, which is usually directly related to its morphological and chemical properties. Moreover, phase imaging techniques do not require contrast agents and avoid several issues faced in fluorescence microscopy such as photobleaching and phototoxicity. While conventional phase imaging methods such as phase contrast and differential interference contrast (DIC) microscopy only capture qualitative phase information, quantitative phase imaging (QPI) has been rapidly growing in the past two decades. For instance, techniques like digital holographic microscopy, tomographic QPI, Fourier ptychography, and lens-less imaging overcome limitations of qualitative phase imaging methods to acquire quantitative phase data.

Miniaturized microscopes have garnered great interest in recent decades since they enable and facilitate in-vivo biological imaging in freely moving objects and in portable applications. Miniaturized systems have only been demonstrated as different forms of amplitude imaging modules such as single or two-photon fluorescence microscopes. This is mainly because QPI systems usually require an interference "setup" to retrieve the phase information, and such setups need complicated and bulky optical systems. This had left miniaturized QPI microscopes that are of interest in various fields such as biomedicine out of reach until now.

Dielectric metasurfaces are a category of diffractive optical elements consisting of nano-scatterers that enable the control of light in sub-wavelength scales. In addition, metasurfaces can simultaneously provide multiple distinct functionalities through various schemes such as spatial multiplexing or more sophisticated designs of the nano-scatterers. These capabilities, compactness, low weight, and compatibility with conventional nanofabrication processes have made them suitable candidates for miniaturized optical devices such as miniaturized microscopes, on-chip spectrometers, and endoscopes. In addition, vertical integration of multiple metasurfaces has been introduced to achieve enhanced functionalities. Despite these vast advances, applications of metasurfaces for QPI have not previously been explored. Although different types of spatial field differentiators, that may be regarded as qualitative phase imaging devices, have been proposed, their investigation has been limited to optical computing and optical signal processing.

SUMMARY

The disclosed methods and devices address the described challenges and provide practical solutions to the above-mentioned problems.

A miniaturized quantitative phase gradient microscope device (QPGM) generally inspired by the classical DIC microscope and based on an integrated system of multifunctional dielectric metasurfaces and related methods are disclosed. The described methods and devices leverage the two unique properties of metasurfaces which are compactness and multi-functionality via both polarization and spatial multiplexing methods Experimental results showing that the millimeter-scale optical device can capture quantitative phase gradient images (PGIs) from phase resolution targets and biological samples are also presented.

According to a first aspect of the present disclosure, a miniaturized quantitative phase gradient microscope (QPGM) is provided, comprising: a polarization sensitive and beam splitting first metasurface layer including a birefringent first metasurface lens; a polarization sensitive second metasurface layer including birefringent second metasurface lenses; wherein: i) the first metasurface layer is configured to: receive light from an object, split the light into plural split light beams travelling in separate directions towards corresponding second birefringent metasurface lenses, each split light beam including a transverse electric polarization and a transverse magnetic polarization, and ii) the second metasurface layer is configured to: receive the split light beams at the corresponding second birefringent metasurface lenses, and form separate phase-shifted differential interference contrast (DIC) images.

According to a second aspect of the present disclosure, a metasurface-based method of generating a quantitative phase gradient image of an object is disclosed, comprising: by a first set of one or more metasurfaces, receiving a light beam from an object; by the first set of one or more metasurfaces, spatially splitting the light beam into plural separate split light beams, each separate split light beam including a transverse electric polarization and a transverse magnetic polarization; by a second set of plural metasurfaces, forming corresponding phase-shifted differential interference contrast images through the plural separate split light beams, and generating a phase gradient image from the differential interference contrast images Further aspects of the disclosure are provided in the description, drawings and claims of the present application.

DESCRIPTION OF THE DRAWINGS

FIG. 5B shows a table including exemplary values for parameters used to calculate phase profiles associated with an exemplary metasurface according to embodiments of the present disclosure.

FIG. 5E shows a table including exemplary values for parameters used to calculate phase profiles associated with an exemplary metasurface according to embodiments of the present disclosure.

DETAILED DESCRIPTION

Figure 1:
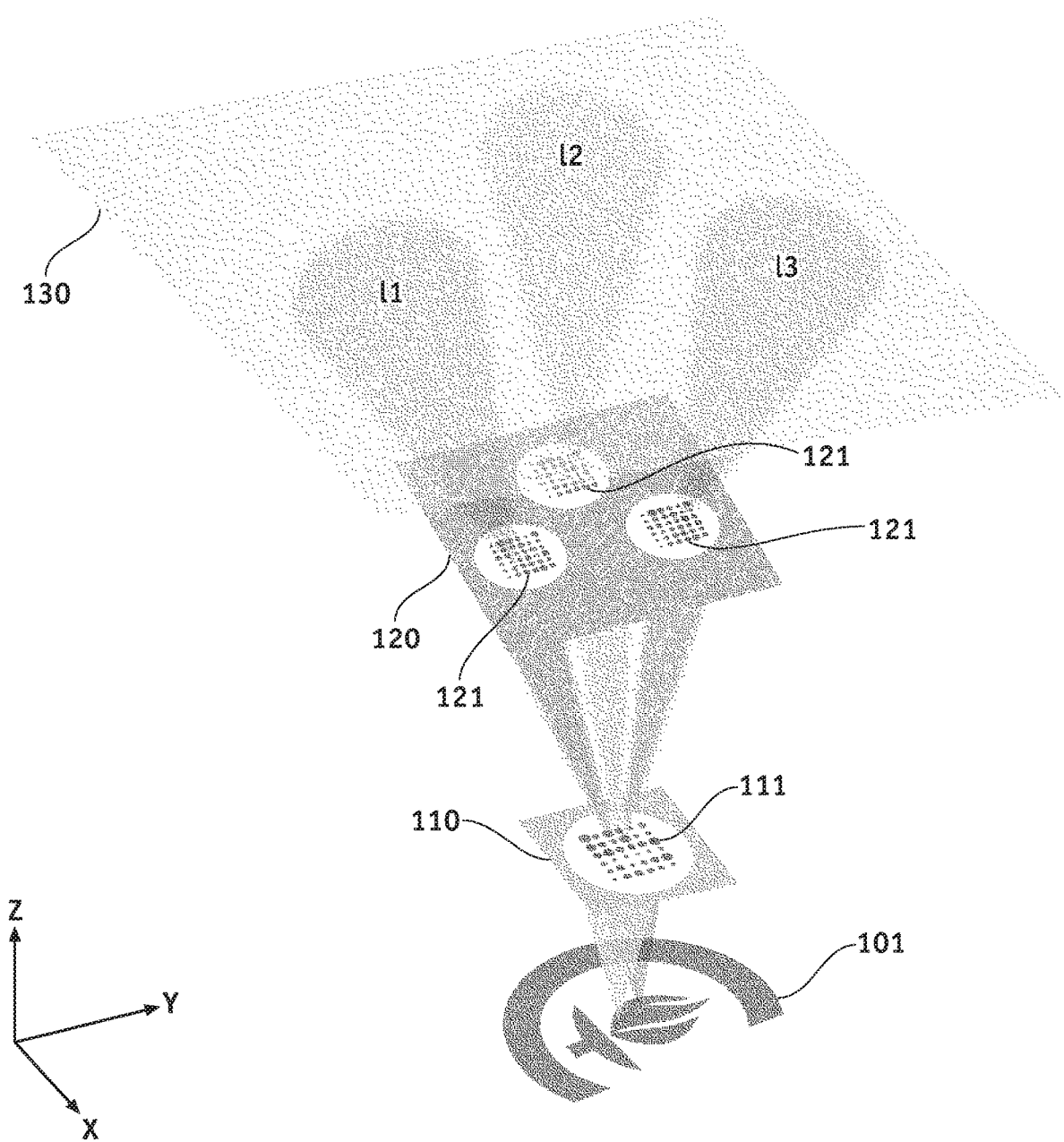
FIG. 1 shows an exemplary miniaturized QPGM according to an embodiment of the present disclosure.

FIG. 1 shows a miniaturized QPGM (100) in accordance with an embodiment of the present disclosure. QPGM (100) comprises first metasurface layer (110) including birefringent metasurface lens (111), and second metasurface layer (120) including a set of three birefringent metasurface lenses (121). Birefringent metasurface lenses are known as such from, e.g., U.S. Pat. No. 9,739,818, incorporated herein by reference in its entirety. During operative conditions, first metasurface layer (110) captures two images from object (101) for TE and TM polarizations with focal points that are separated along the y axis. In addition, first metasurface layer (110) splits the captured light equally into three separate directions towards the three metasurface birefringent lenses (121). In other words, first metasurface layer (110) essentially provides two main functionalities of polarization and spatial multiplexing. After the spatially multiplexed light is received by the birefringent metasurface lenses (121), second metasurface layer (120) will form three DIC images ($I_1$, $I_2$, $I_3$) with three different phase offsets between the TE and TM polarizations at image plane (130). In other words, each metasurface lens (121) of second metasurface layer (120) constitutes effectively a separate DIC microscope system with first metasurface layer (110). As will be described later and more in detail, the light received by first metasurface layer (110) of FIG. 1 may be linearly polarized (e.g. aligned to +45° with respect to the image plane) and a linear polarizer (e.g. aligned to −45° with respect to the image plane) may be placed between second metasurface layer (120) and image plane (130). The linear polarizer (aligned for example to −45°) may also be included as part of image plane (130) which plane may be part of an image sensor (e.g. a CMOS image sensor) or a camera by being placed, e.g. on top of the image sensor or on top of the camera. In accordance with an embodiment of the present disclosure, object (101) may be transparent.

Figure 2A:
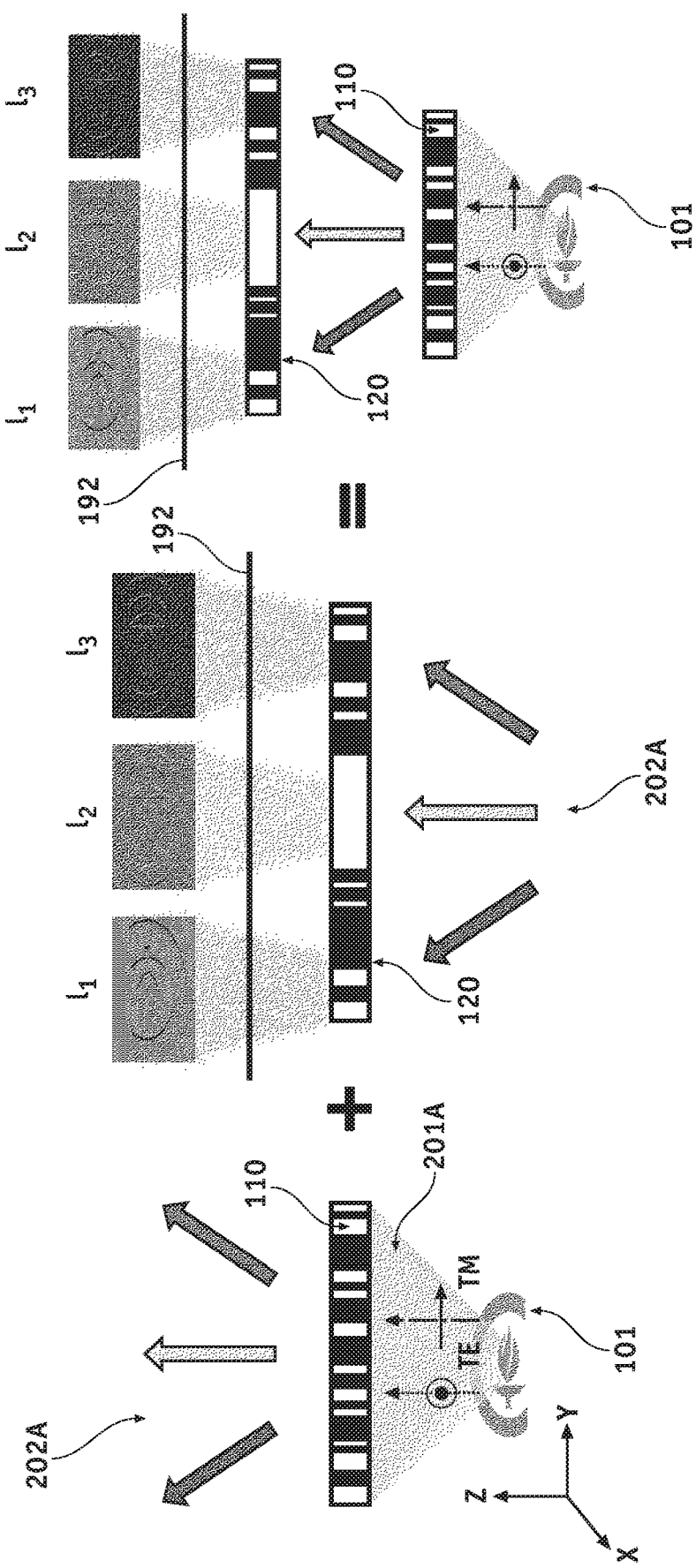
FIG. 2A shows the functionalities of various elements shown in FIG. 1.

FIG. 2A illustrates the functionalities of first and second metasurface layers (110, 120) separately (panels on the left and in the middle) and in combination (panel on the right), and shows how the three DIC images ($I_1$, $I_2$, $I_3$) are formed. As mentioned previously, polarized light (201A) received from object (101) by first metasurface layer (110) is split (i.e. spatially multiplexed), thus generating three split light beams (202A) traveling in three different directions towards second metasurface layer (120). Each split light beam (202A) includes TE and TM polarizations, meaning that in addition to spatial multiplexing, metasurface layer (110) may also function as a polarization multiplexer. Birefringent metasurface lenses (121) (see FIG. 1) are essentially polarization-sensitive off-axis lenses. A combination of a polarizer (192), which may be aligned to, for example −45°, and birefringent metasurface lenses (121) will then form three DIC images ($I_1$, $I_2$, $I_3$) having different phase offsets between the corresponding TE and TM polarizations. The role of the three metasurface lenses (121) is two-fold. Each lens captures an interference pattern with the polarizer (192) at image plane (130). The three lenses also perform phase-shifting and result in three different phase-shifted interference patterns so that quantitative phase gradient information, i.e. PGI, can then be calculated.

Figure 2B:
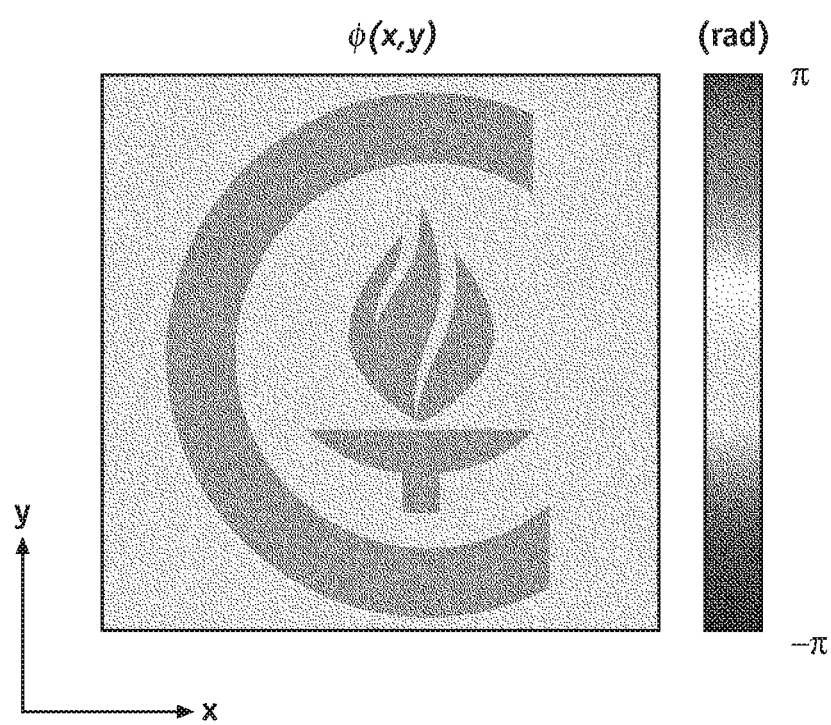
FIG. 2B shows an exemplary binary phase target.
Figure 2C:
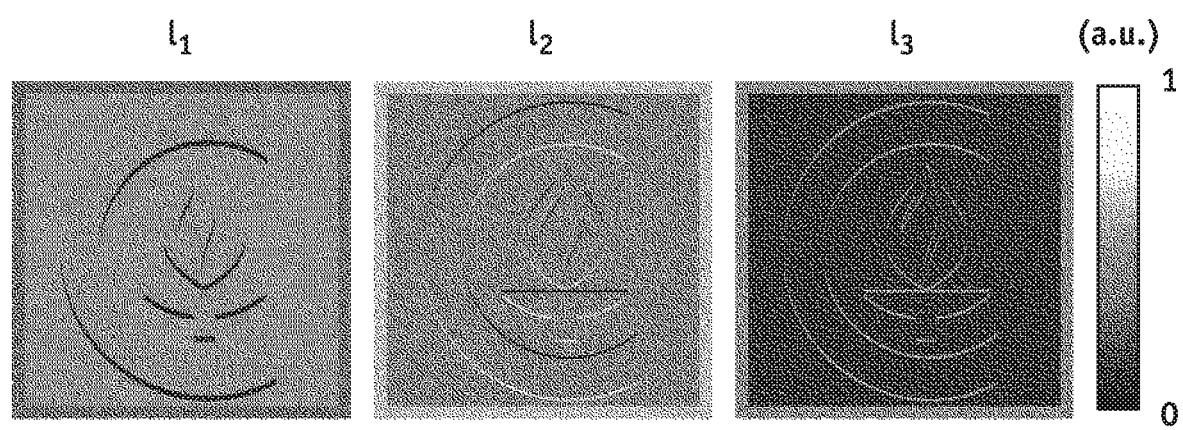
FIG. 2C shows exemplary images according to an embodiment of the present disclosure.

In order to further clarify the above-described teaching, reference is made to FIG. 2B showing an exemplary binary phase target which has optical fields with a unity amplitude, $U(x, y) = e^{i\varphi(x,y)}$. For this particular example, as described previously, QPGM (100) of FIG. 1 simultaneously captures three DIC images ($I_1$, $I_2$, and $I_3$) as shown in FIG. 2C. $I_1$, $I_2$, and $I_3$ can be written as:

$$I_j = |U(x,y) - e^{i\varphi_j} U(x, y-\Delta y)| \tag{a}$$

where $$\varphi_j = \varphi_0 + \frac{2\pi}{3}(j-1),$$

$\varphi_0$ is a constant phase, and $\Delta y$ is the sheared distance between TE and TM polarizations at the object plane. $I_1$, $I_2$, and $I_3$ in FIG. 2C show a strong contrast at the top and bottom edges of the sample because each DIC image results from the interference of the two sheared optical fields along the y-axis by equation above. Using $I_1$, $I_2$, and $I_3$, one can calculate the unidirectional gradient of the phase sample with respect to y, $\nabla_y \varphi(x, y)$, through a three-step phase shifting method and obtain the following:

$$\nabla_y \varphi = \frac{1}{\Delta y} \arctan\left(\sqrt{3} \frac{I_2 - I_3}{(2I_1 - I_2 - I_3)}\right) - \nabla_y \varphi_{cali} \tag{b}$$

Figure 2D:
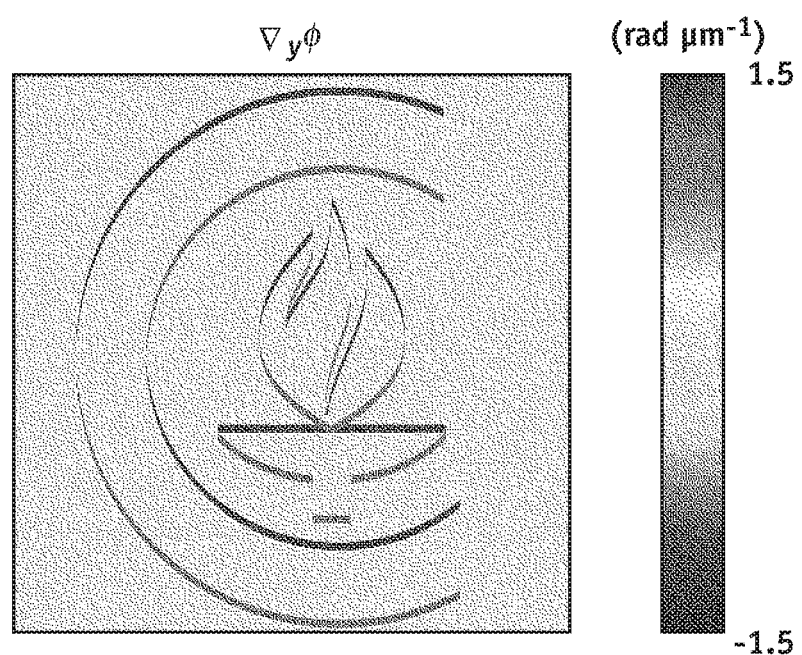
FIG. 2D shows the PGI calculated from the three DIC images in FIG. 2C.

Here, $\nabla_y \varphi_{cali}$ is the PGI calculated in the absence of the sample that may be used for calibration. FIG. 2D shows the PGI calculated from the three DIC images in FIG. 2C.

In what follows various devices and methods for implementing the above-disclosed teachings will be described, followed by a detailed description of various functionalities of first and second metasurface layers (110, 120) together with numerical analysis of the performance of miniaturized QPGMs (100, 200).

Figure 3A:
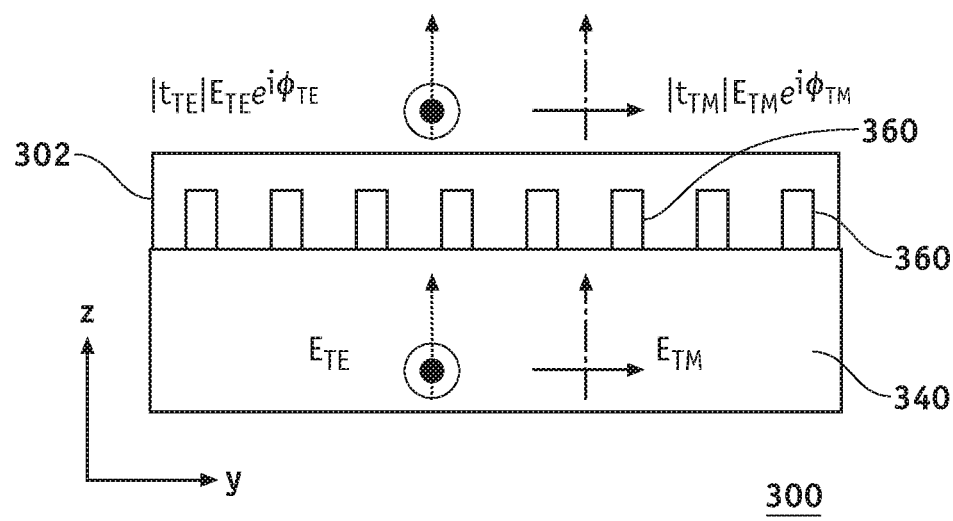
FIGS. 3A-3B show metasurface fabrication concepts.
Figure 3B:
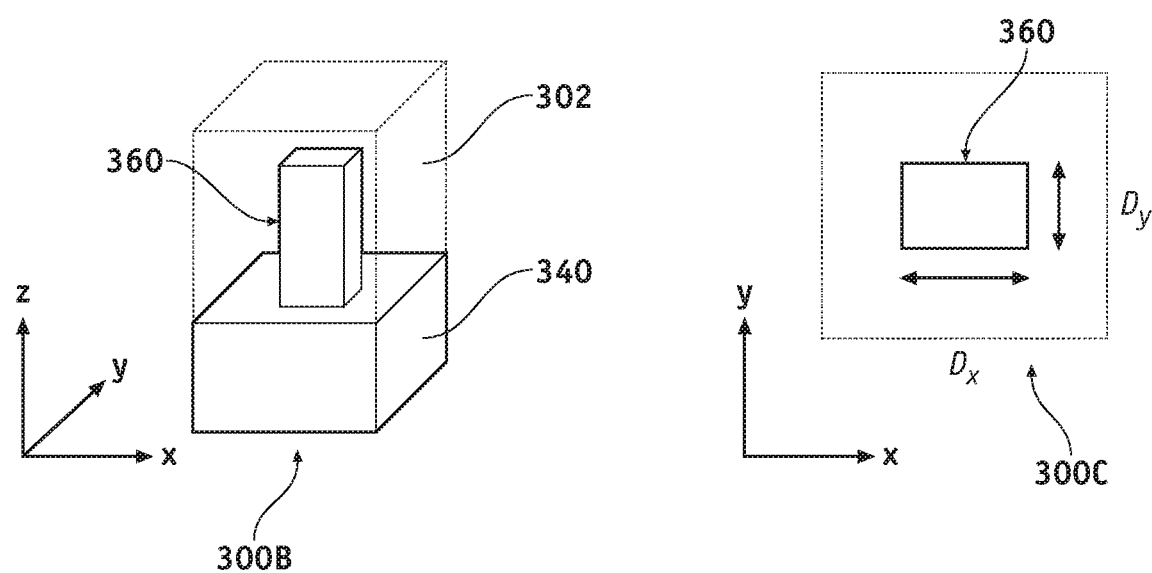

FIGS. 3A-3B illustrate metasurface fabrication techniques as also generally disclosed in the above-mentioned and incorporated patent documents. FIG. 3A shows a side view of a metasurface (300) comprising an array of nanoposts (360). FIG. 3B shows, on the left panel, a unit cell (300B) which represents essentially the building block of metasurface (300) of FIG. 3A. The array of nanoposts (360) is placed on a transparent substrate (340) which may be fabricated using fused silica. According to an embodiment of the present disclosure, the nanoposts (360) may be rectangular, fabricated from amorphous silicon, and cladded by, for example, an 8-μm-thick SU-8 layer (302) for protection. The transmission phase of the two orthogonal polarizations can be independently controlled using the nanoposts. By way of example, and not of limitation, the amorphous silicon layer is 664 nm thick, and the lattice constant is 380 nm. Also shown in FIG. 3B is a top view (300C) of unit cell (300B) and showing the dimensions of the rectangular nanopost (360), $D_x$ and $D_y$, which are selected in accordance with the desired functionality of the metasurface.

Figure 3C:
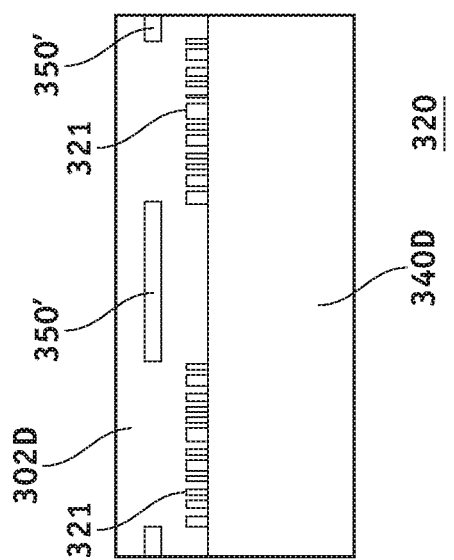
FIG. 3C shows an exemplary metasurface layer according to an embodiment of the present disclosure.

FIG. 3C shows an exemplary metasurface layer (310) according to an embodiment of the present disclosure. Metasurface layer (310) represents essentially an exemplary implementation of first metasurface layer (110) of FIG. 1. Metasurface layer (310) comprises birefringent metasurface lens (311) made of an array of nanoposts sitting on a transparent substrate (340C) which may be made of fused silica. The array of nanoposts provides the functionalities of first metasurface birefringent lens (111) of FIG. 1. The nanoposts of such array may be rectangular, fabricated from amorphous silicon, and cladded by, for example, an 8-μm-thick SU-8 layer (302C) for protection. Metasurface layer (310) further comprises gold aperture (350) used to block undesired diffraction and external noise.

Figure 3D:
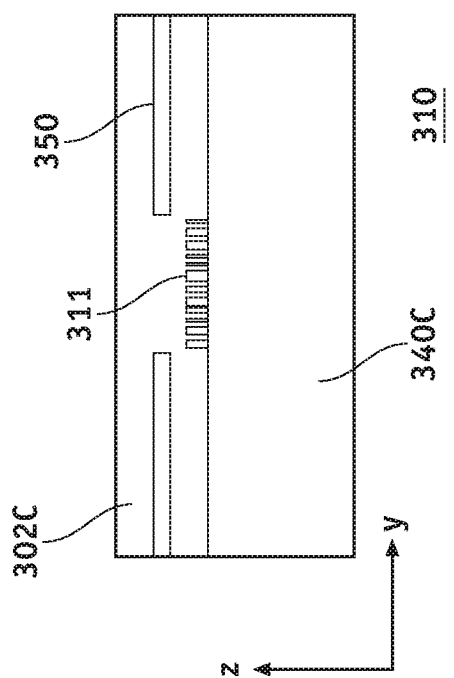
FIG. 3D shows an exemplary metasurface layer according to another embodiment of the present disclosure.

FIG. 3D shows an exemplary metasurface layer (320) according to another embodiment of the present disclosure. Metasurface layer (320) represents essentially an exemplary implementation of second metasurface layer (120) of FIG. 1. Metasurface layer (320) comprises three birefringent metasurface lenses (321) (only two of which are shown in the bidimensional representation of the figure) made of arrays of nanoposts sitting on a transparent substrate (340D) which may be made of fused silica. The three arrays of nanoposts provide the functionalities of second metasurface birefringent lenses (121) of FIG. 1. Also in this case, the nanoposts of the array may be rectangular, fabricated from amorphous silicon, and cladded by for example, an 8-μm-thick SU-8 layer (302D) for protection. Metasurface layer (320) further comprises gold apertures (350') used to block undesired diffraction and external noise. Metasurface layers (310, 320) of FIGS. 3C-3D may be fabricated to operate at a wavelength of 850 nm although various designs operating at other wavelengths may also be envisaged in accordance with embodiments of the present disclosure.

With further reference to FIGS. 3C-3D, in order to minimize the effects of geometric aberrations, the phase profiles of the metasurfaces may be further optimized using known ray tracing methods over a field of view (FOV) of 140 μm in diameter. Gold apertures (350, 350') may be circular and patterned through photo-lithography.

Figure 3E:
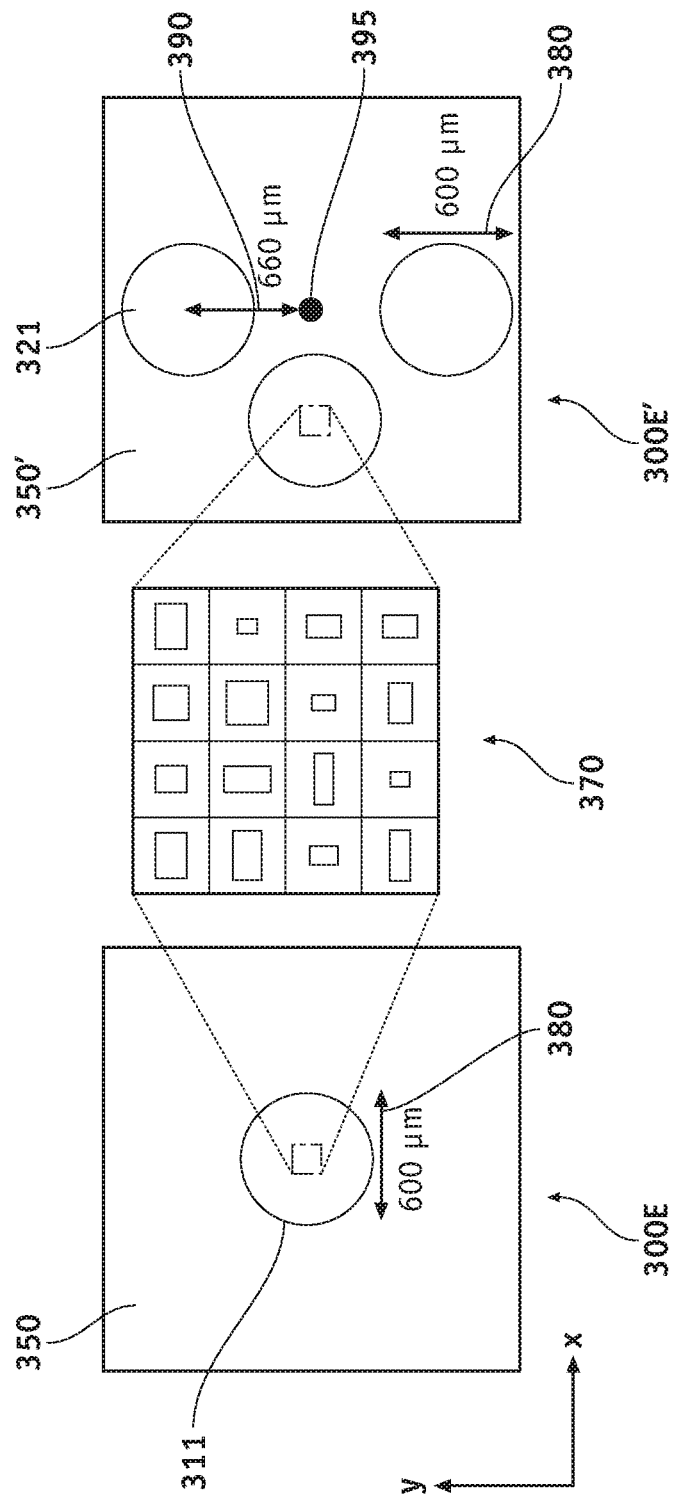
FIG. 3E shows top and bottom views of the metasurface of FIG. 3C.

FIG. 3E shows a top view (300E) of metasurface (310) of FIG. 3C. Also shown in FIG. 3E are gold aperture (350) and birefringent metasurface lens (311). Diameter (D) of the array of birefringent metasurface lens (311), also shown with numeral (380) may be chosen to be, for example, equal to 600 μm.

FIG. 3E further shows a top view (300E') of metasurface (320) of FIG. 3D. Also shown in FIG. 3E are gold apertures (350') and the three birefringent metasurface lenses (321) of FIG. 3D. Diameter (D) of each of the birefringent metasurface lenses (321), also shown with numeral (380), may be chosen to be for example, equal to 600 μm, although other designs in accordance with the teachings of the disclosure may be envisaged where the diameters of the three metasurface lenses (321) may be different from one another and each being different from 600 μm. The distance (390) between the center of each of the three birefringent metasurface lenses (321) and the center (395) of metasurface (320) of FIG. 3D may be selected, for example, to be equal to 660 μm. A magnified top view (370) of the nanoposts is also shown in the middle panel of FIG. 3E.

Figure 3F:
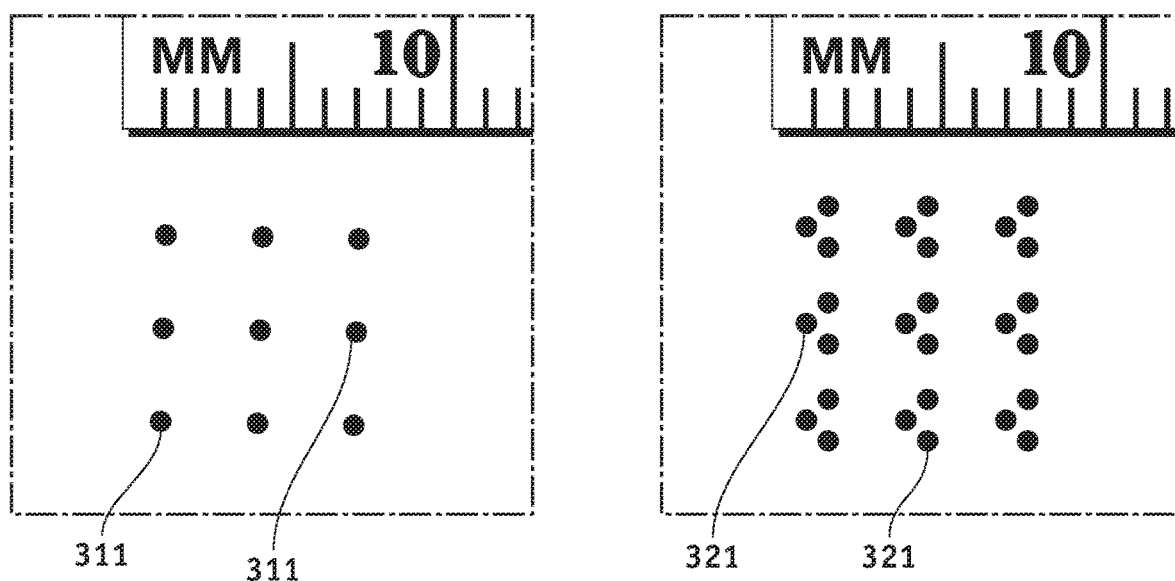
FIGS. 3F-3G show optical and scanning electron microscope images of two layers of exemplary metasurfaces fabricated according to embodiments of the present disclosure.
Figure 3G:
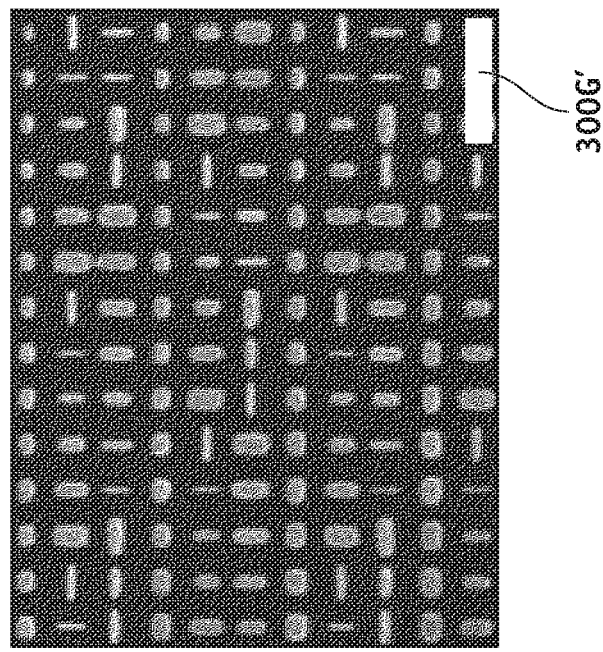
Figure 3G:
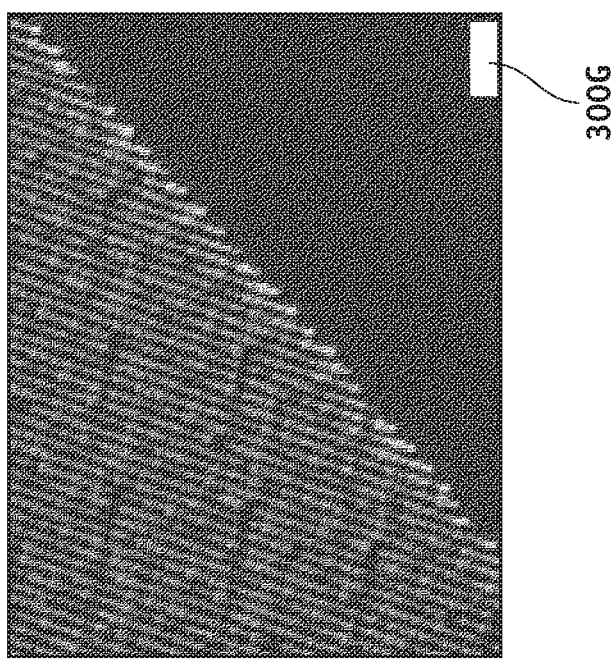

FIGS. 3F-3G show the optical and scanning electron microscope images of the two layers of the fabricated metasurfaces (310, 320), respectively. According to several embodiments, the miniaturized, compact device according to the teachings of the present disclosure has dimensions each being in the mm range. In the design shown in FIGS. 3F-3G, the whole QPGM system would fit within a cube that is 1.92×1.26×2.70 mm$^3$ including the space between the metasurfaces. The magnification and objective numerical aperture (NA) of the QPGM are 1.98× and 0.4, respectively. Although the phase map is optimized for the central area of 140 μm in diameter, the total FOV of the system is 336 μm in diameter. In addition, the separation between the optical axes for TE and TM polarizations is 1.5 μm. Nine copies of the fabricated metasurface-based QPGM system are shown. Scale bars (300G, 300G') of FIG. 3G, indicate dimensions of 2 μm and 1 μm, respectively.

Figure 3H:
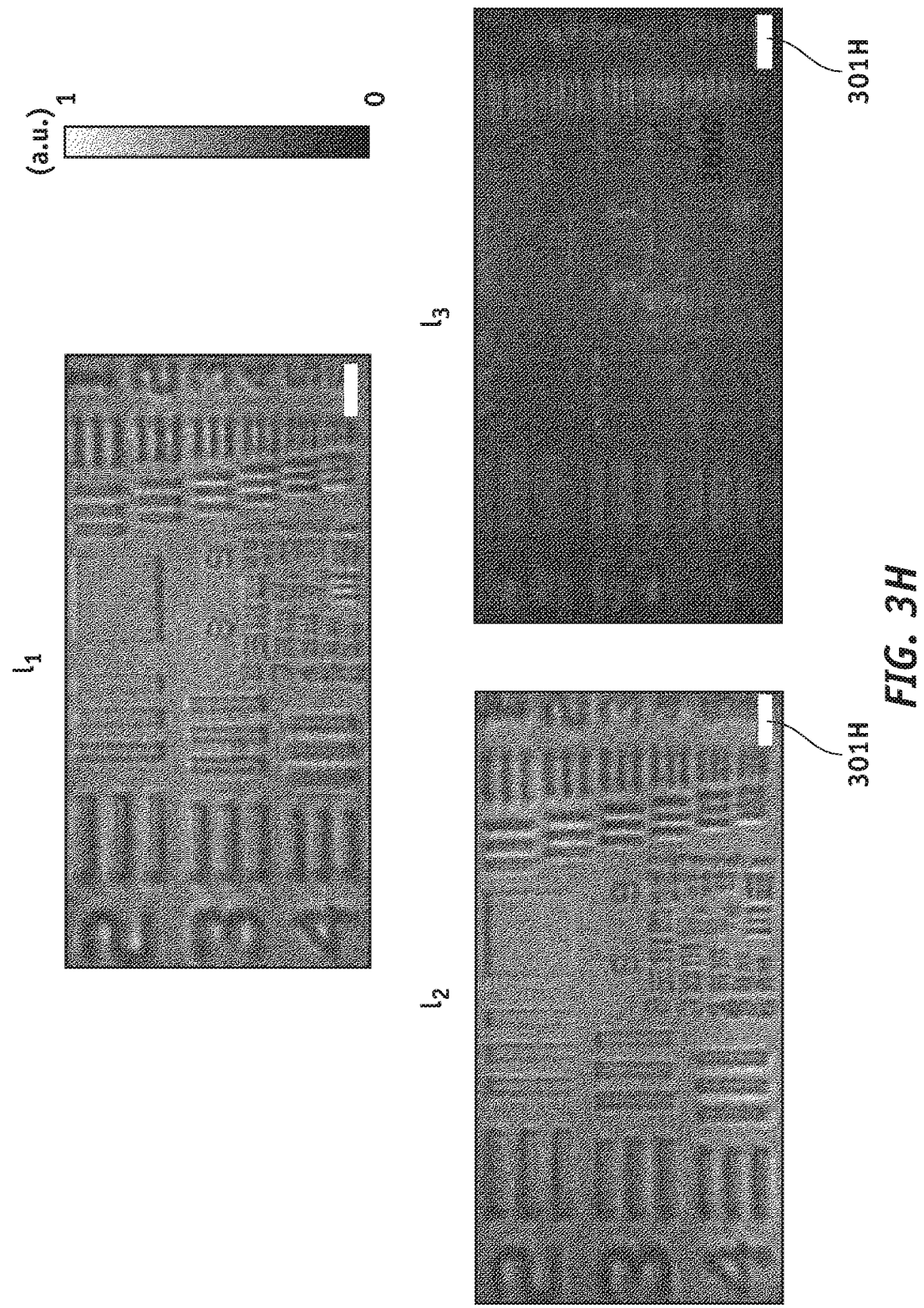
FIG. 3H shows three exemplary DIC images according to an embodiment of the present disclosure.
Figure 3I:
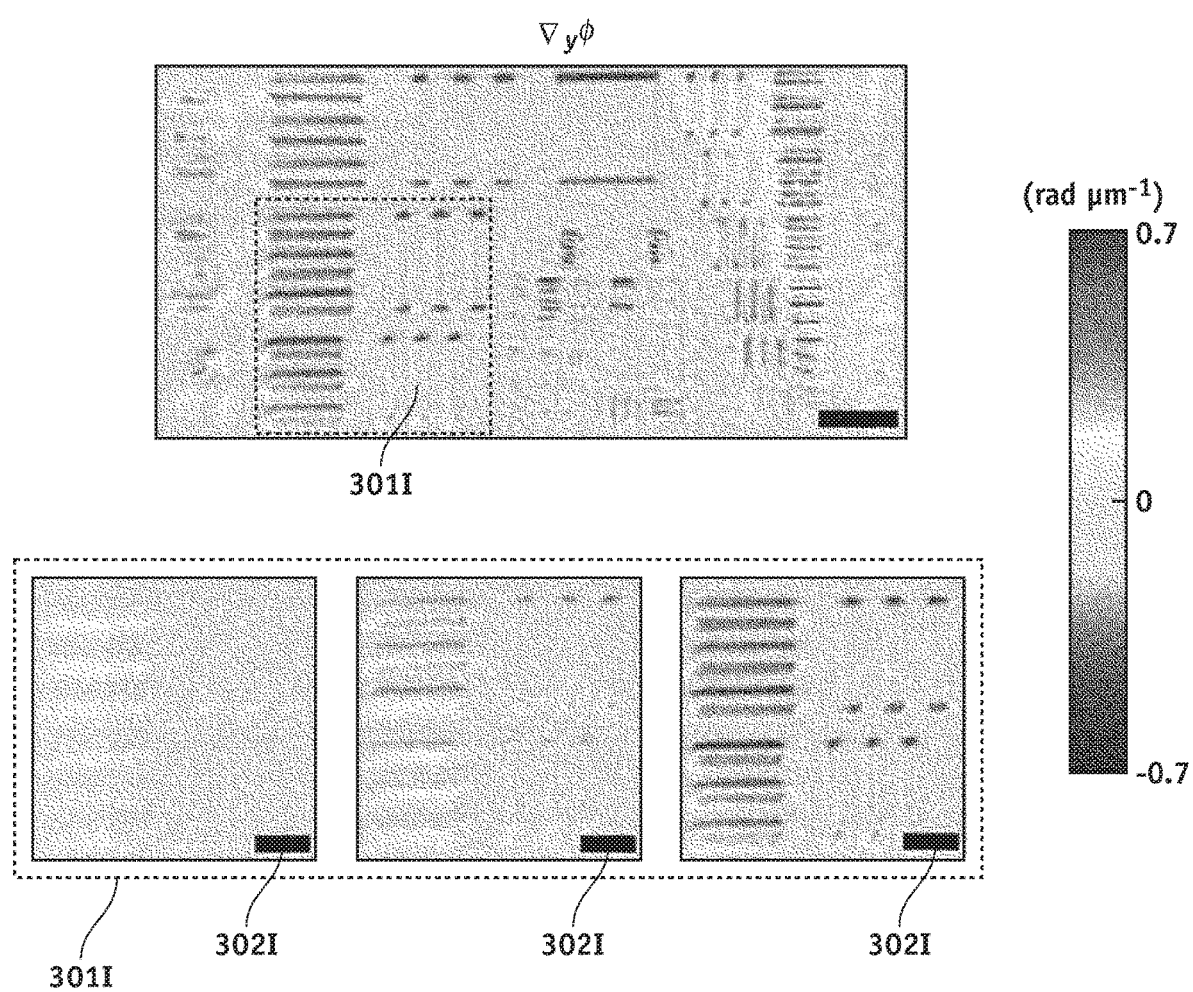
FIG. 3I shows exemplary PGIs according to embodiments of the present disclosure.

FIG. 3H shows three DIC images of a 314-nm-thick QPI target captured by a QPGM built based on the embodiments of FIGS. 3C-3D. Scale bars (301H) shown in the figure indicate a dimension of 25 μm. FIG. 3I shows the PGIs captured for the section (301I) of the target, and for targets with three different thicknesses of 105 nm, 207 nm and 314 nm (left to right), respectively. Scale bars (302I), indicate a dimension of 15 μm.

Figure 3J:
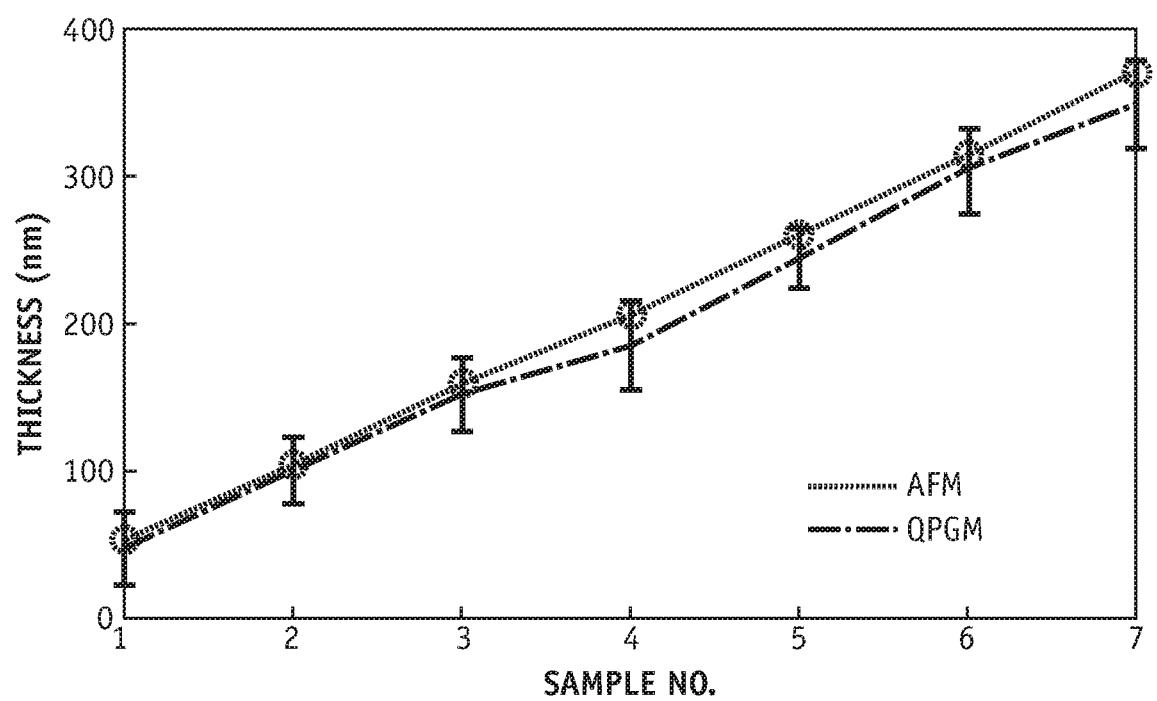
FIG. 3J shows exemplary estimated target thicknesses according to embodiments of the present disclosure.

FIG. 3J shows the target thicknesses estimated from the PGIs for seven different targets with different thicknesses, in addition to the values measured using atomic force microscopy (AFM). The plotted thicknesses estimated with the QPGM are averaged over 100 arbitrarily chosen points on the sample edges. Error bars represent standard deviations of the estimated values. The agreement between these measurements shows the ability of the devices and methods according to the present disclosure to retrieve quantitative phase data. In order to estimate the target thickness, the phase gradient is integrated at the edges of the targets along the y axis to calculate the phase. Then, the thickness is estimated from the phase, refractive index of the polymer constituting target, and the wavelength. Especially, The QPGM can clearly capture phase gradient information as small as 92.3 mrad/μm, which corresponds to a phase of 207 mrad. In addition, the measured spatial and temporal noise levels are 36.9±0.7 and 11.4 mrad/μm, respectively. Furthermore, the lateral resolutions achieved in the experiment along the x- and y-axes are 2.76 μm and 3.48 μm, respectively. Comparing with the 1.06-μm theoretical diffraction limit, the reduced resolutions result from the geometric aberration of the device, misalignment in the optical setup, and imperfect fabrication.

Figure 4A:
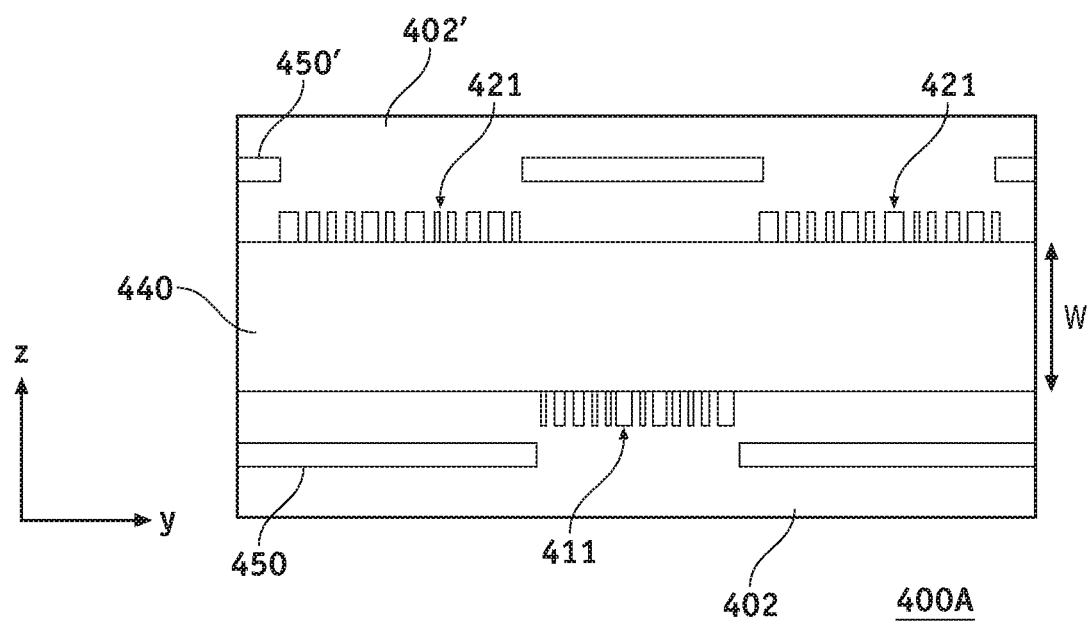
FIG. 4A shows a double-sided miniaturized QPGM according to an embodiment of the present disclosure.

Based on the teachings disclosed so far, in order to further miniaturize the device, monolithically integrated double-sided metasurface QPGMs may also be made. FIG. 4A shows a double-sided miniaturized QPGM (400A) in accordance with embodiments of the present disclosure. Similarly to what was described with regards to embodiments of FIG. 1 and FIGS. 3C-3D, QPGM (400A) comprises birefringent metasurface lens (411) and a set of three metasurface lenses (421). Instead of being patterned on separate transparent substrates, birefringent metasurface lens (411) and metasurface lenses (421) are placed on opposite sides of a common transparent substrate (440) having a width of (W). Metasurface lenses (411, 421) may each be made of an array of nanoposts. According to embodiments of the present disclosure, such array of nanoposts may be made of amorphous silicon, have a rectangular shape, and cladded by for example, with an 8-μm-thick SU-8 layer (402, 402') on each side of the common transparent substrate (440) for protection.

With further reference to FIG. 4A, QPGM (400A) further comprises gold apertures (450, 450') on each side of the common transparent substrate (440), the gold apertures (450, 450') being used to block undesired diffraction and external noise. Common transparent substrate (440) may be made of fused silica with a width of, for example, 1 mm, although a different material, and widths other than 1 mm may also be envisaged depending on the application.

Figure 4B:
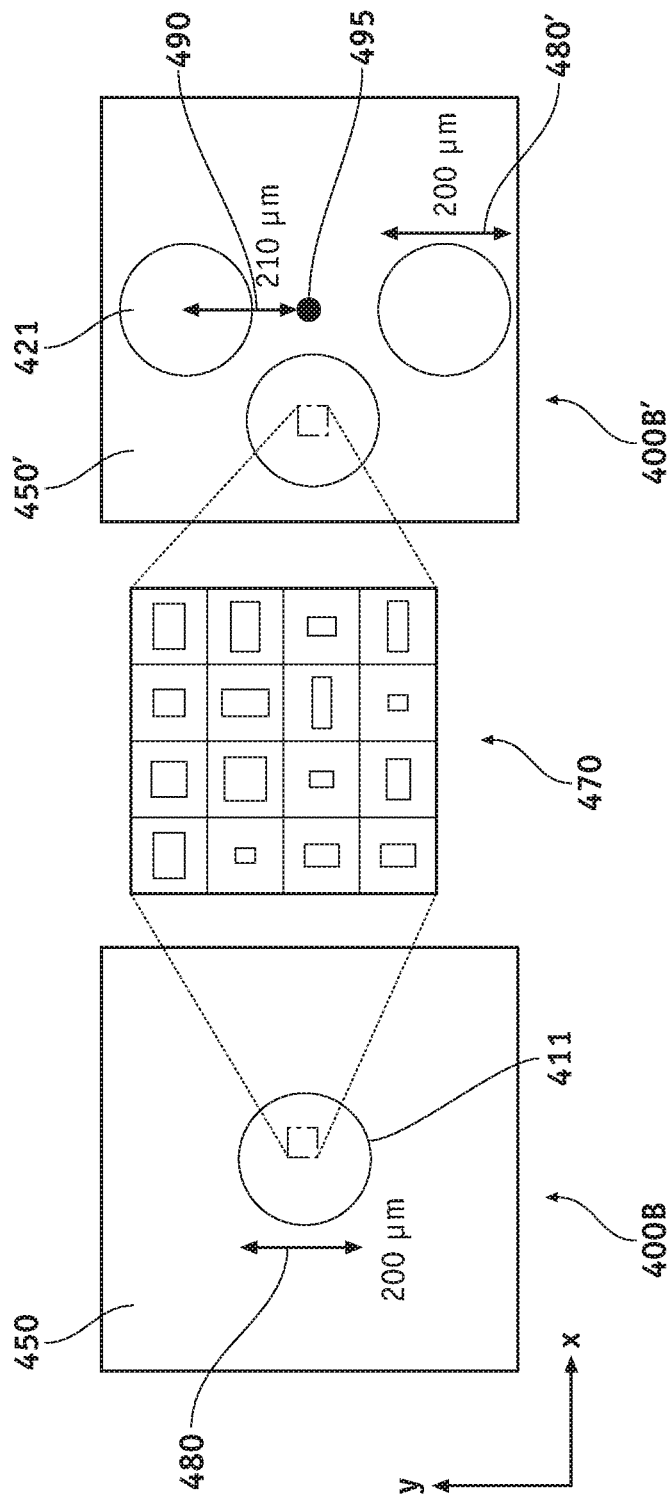
FIG. 4B shows top and bottom views of the double-sided miniaturized QPGM of FIG. 4A.

FIG. 4B shows, on the left, a bottom view (400B) of QPGM (400A) of FIG. 4A. Also shown in FIG. 4B are gold aperture (450) and birefringent metasurface lens (411). Diameter (D) of birefringent metasurface lens (411), also shown with numeral (480) may be chosen to be, for example, equal to 200 μm.

FIG. 4B further shows a top view (400B') of QPGM (400A) of FIG. 4A. Also shown in FIG. 400B are gold apertures (450') and the three birefringent metasurface lenses (421). Diameter (D) of each of the birefringent metasurface lenses (421), also shown with numeral (480') may be chosen to be for example, equal to 200 μm, although other designs in accordance with the teachings of the disclosure may also be envisaged where the diameters of the three metasurface lenses (421) may be different from one another and each different from 200 μm. The distance (490) between the center of each of the three birefringent metasurface lenses (421) to the center (495) of QPGM (400A) of FIG. 4A may be selected, for example, to be equal to 210 μm. A magnified view (470) of the nanoposts is also shown in the middle of FIG. 4B.

Figure 4C:
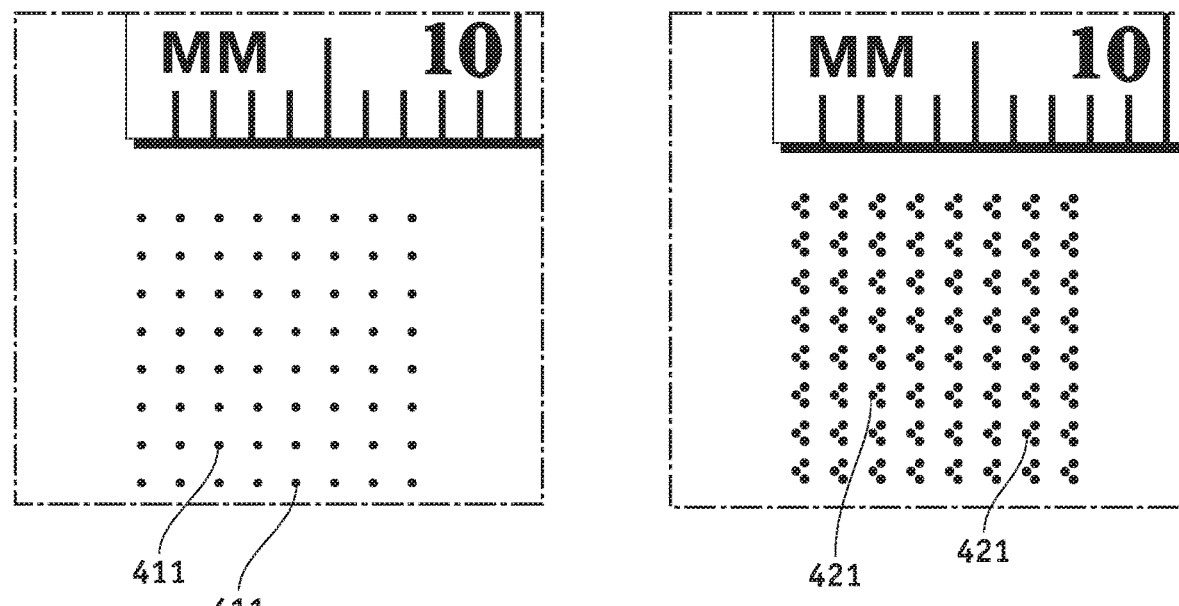
FIG. 4C shows optical images views of an exemplary 8×8 array of the double-sided QPGM according to embodiments of the present disclosure.

Optical images of bottom (left) and top (right) views of an 8×8 array of the double-sided QPGM (400A) of FIG. 4A are shown in FIG. 4C. The total volume of QPGM (400A) of FIG. 4A is 0.62×0.41×1.00 mm3, with a magnification of 1.60×, and a field of view of 140 μm in diameter. With reference to FIG. 4A, the person skilled in the art will appreciate that the double-sided QPGM is compact, mechanically robust, and does not need further alignment after fabrication.

Figure 4D:
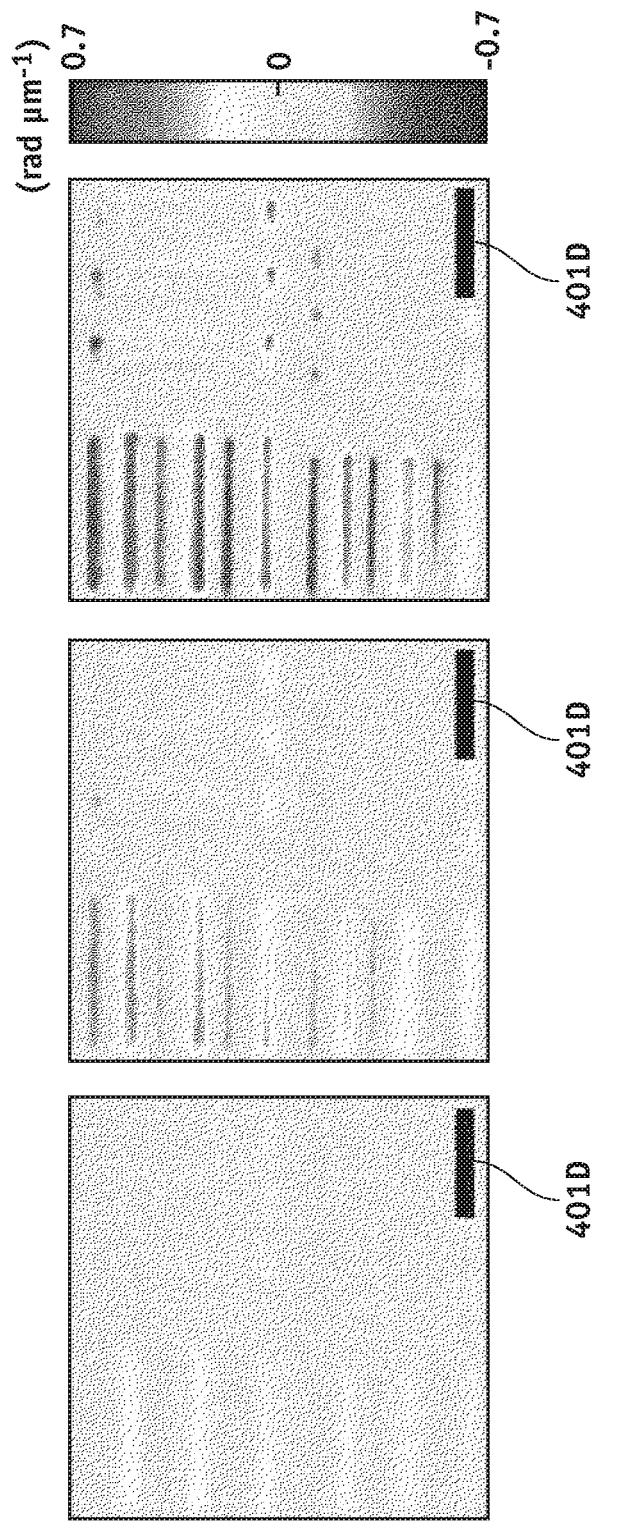
FIG. 4D shows exemplary DIC images according to embodiments of the present disclosure.
Figure 4E:
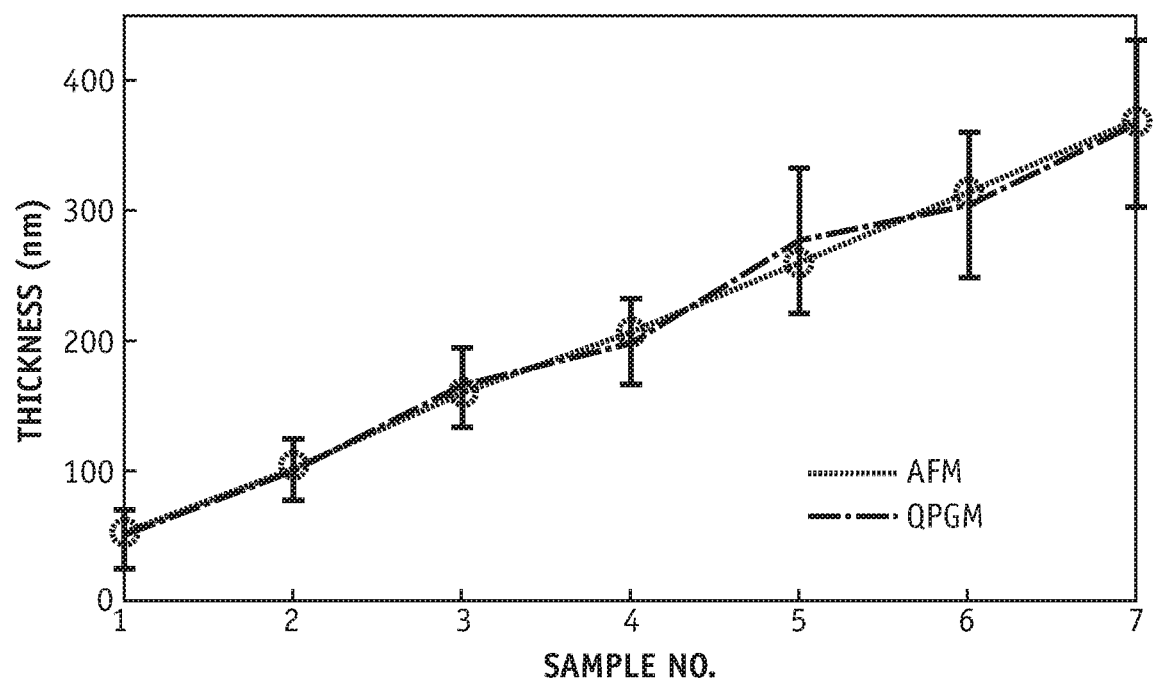
FIG. 4E shows exemplary estimated target thicknesses according to embodiments of the present disclosure.

FIG. 4D shows three DIC images of the same targets corresponding to DIC images of FIG. 3I, but this time captured by a double-sided QPGM built based on the embodiment of FIG. 4A. Scale bars (401D) shown in the figure indicate a dimension of 15 μm. FIG. 4E shows the target thicknesses estimated from the PGIs, for seven different target samples with different thicknesses, in addition to the values measured using atomic force microscopy (AFM). The plotted thicknesses estimated with the QPGM are averaged over 100 arbitrarily chosen points on the sample edges. Error bars represent standard deviations of the estimated values.

Figure 5A:
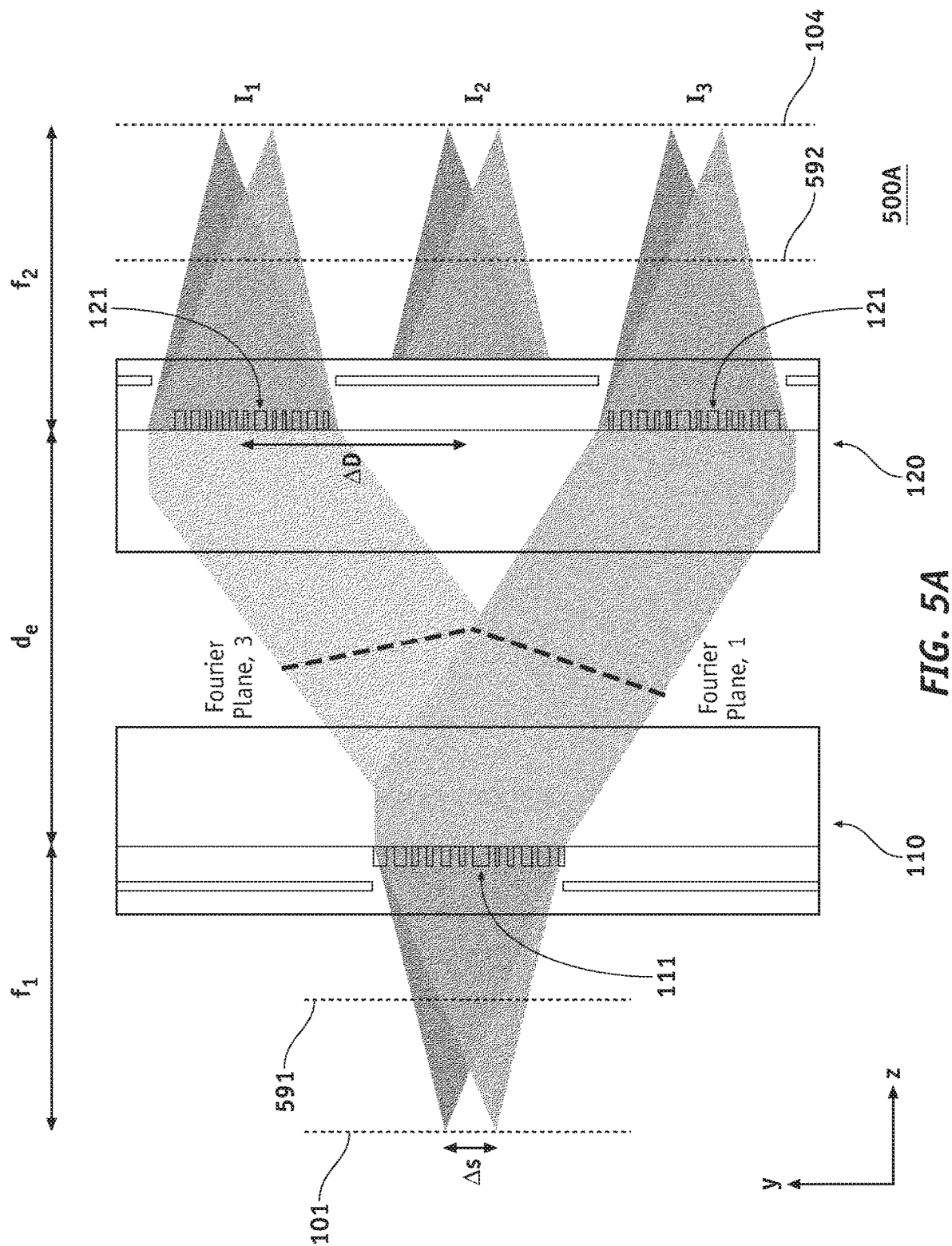
FIG. 5A shows a side view of an exemplary miniaturized QPGM according to embodiments of the present disclosure.

In order to describe in additional detail the functionality of the metasurface layers (120, 130) of FIG. 1, reference is made to FIG. 5A showing a side view of a miniaturized QPGM (500A) according to the teachings of the present disclosure. Also shown in FIG. 5A are a first polarizer (591) placed between object (101) and first metasurface layer (110), and a second polarizer (592) arranged between second metasurface layer (120) and image plane (104). As an example, first and second polarizers (591, 592) may be aligned to +45° and −45° respectively.

With reference to the polarizers, the person skilled in the art will understand that while they are being disclosed as separate from the metasurface layers for simplicity of exposure, embodiments are possible where each polarized is directly attached to its respective metasurface through, e.g., a CMOS technology fabrication process, With continued reference to FIG. 5A, parameters ($f_1$, $f_2$) represent focal distances of metasurface layers (120, 130) respectively, $d_e$ is the distance between the two metasurfaces, $\Delta s$ is the distance between the optical axes for TE and TM polarizations, and $\Delta D$ is the distance between the center of each of the three birefringent lenses (121) from the center of second metasurface layer (120). Detailed numerical analysis of the miniaturized QPGM (500A) has been performed by the inventors, and the phase profiles of first metasurface layer (110) for TE and TM polarizations, $\phi_{Layer_1,TE}$ and $\phi_{Layer_1,TM}$, can be calculated as follows:

$$\phi_{Layer_1,TE} = \sum_{n=1}^{5} \frac{a_n}{R^{2n}}\left(x^2 + \left(y + \frac{\Delta s}{2}\right)^2\right)^n - k_{grat,1} y \quad (1)$$

$$\phi_{Layer_1,TM} = \sum_{n=1}^{5} \frac{a_n}{R^{2n}}\left(x^2 + \left(y - \frac{\Delta s}{2}\right)^2\right)^n - k_{grat,1} y \quad (2)$$

$$\phi_{Layer_1,TE} = \sum_{n=1}^{5} \frac{a_n}{R^{2n}}\left(x^2 + \left(y + \frac{\Delta s}{2}\right)^2\right)^n - k_{grat,1} x \quad (3)$$

$$\phi_{Layer_1,TM} = \sum_{n=1}^{5} \frac{a_n}{R^{2n}}\left(x^2 + \left(y - \frac{\Delta s}{2}\right)^2\right)^n - k_{grat,1} x \quad (4)$$

$$\phi_{Layer_1,TE} = \sum_{n=1}^{5} \frac{a_n}{R^{2n}}\left(x^2 + \left(y + \frac{\Delta s}{2}\right)^2\right)^n + k_{grat,1} y \quad (5)$$

$$\phi_{Layer_1,TM} = \sum_{n=1}^{5} \frac{a_n}{R^{2n}}\left(x^2 + \left(y - \frac{\Delta s}{2}\right)^2\right)^n + k_{grat,1} y \quad (6)$$

where x and y are Cartesian coordinates from the center of first metasurface layer (110) and $\lambda$ is the operating wavelength in vacuum, $a_n$ are the optimized coefficients of the even-order polynomials in the shifted radial coordinates, $k_{grat,1}$ is the linear phase gradient, and R denotes the radius of the metasurfaces. Detailed information about $a_n$, $k_{grat,1}$, and R is given in table (500B) of FIG. 5B. Since a single set of rectangular nanoposts can only implement one pair of the birefringent phase maps, three different sets of rectangular nanoposts are designed to achieve the three pairs of phase maps in (Eqs. 1 and 2), (Eqs. 3 and 4), and (Eqs. 5 and 6). Then, the three maps of the rectangular nanoposts are interleaved along the x-axis using a spatial multiplexing method.

Figure 5C:
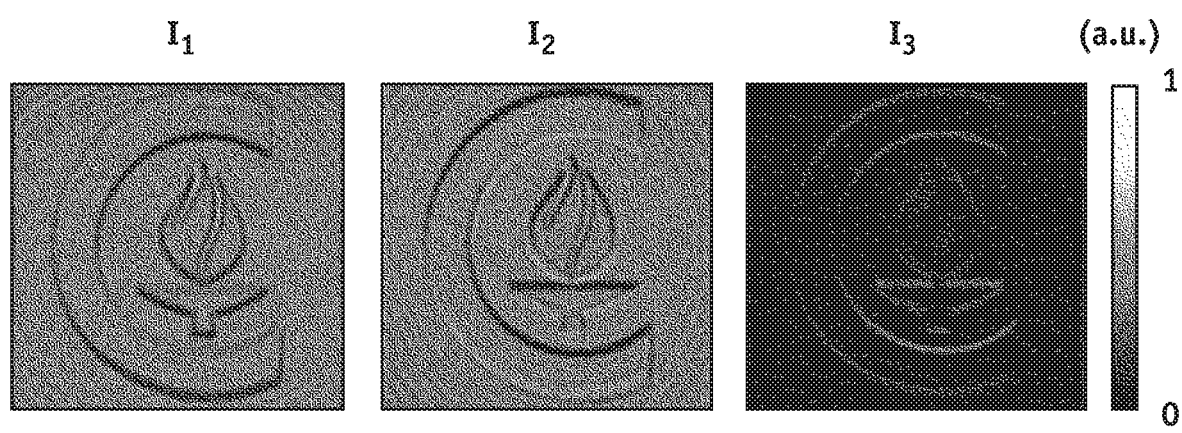
FIG. 5C shows exemplary DIC images according to embodiments of the present disclosure.
Figure 5D:
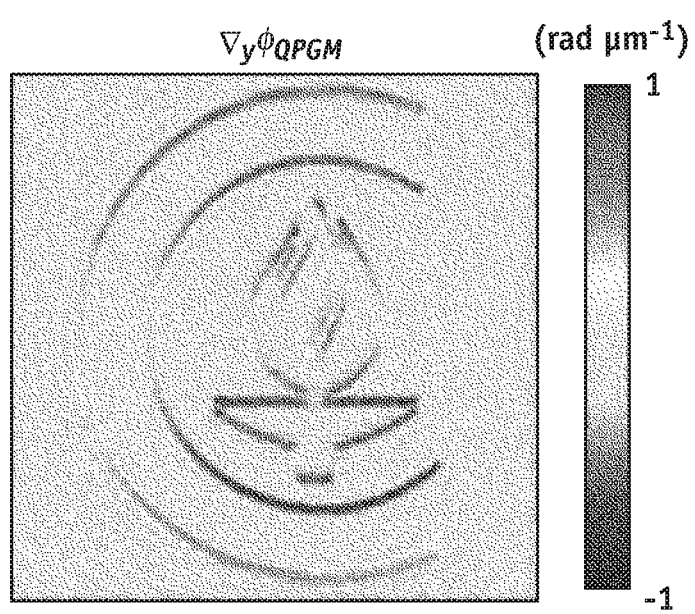
FIG. 5D shows the PGI calculated from the three DIC images in FIG. 5C.

Referring back to FIG. 5A, second metasurface layer (120) has three different birefringent lenses (121) which are identically displaced from the center of metasurface layer (120). The distance from the center of the metasurface layer (120) to the center of each lens, $\Delta D$, may be, for example, 660 μm. The three coordinates of the centers of the lenses measured from the center of metasurface layer (120) are $(0,-\Delta D)$ $(-\Delta D,0)$ and $(0,\Delta D)$. The six phase profiles of the three lenses for TE and TM polarizations can be written as:

$$\phi_{Layer_2,TE} = \sum_{n=1}^{5} \frac{b_n}{R^{2n}} \left(x^2 + \left(y + \Delta D + \frac{\Delta s}{2}\right)^2\right)^n + k_{grat,2} y \quad (7)$$

$$\phi_{Layer_2,TM} = \sum_{n=1}^{5} \frac{b_n}{R^{2n}} \left(x^2 + \left(y + \Delta D - \frac{\Delta s}{2}\right)^2\right)^n + k_{grat,2} y + \phi_0 \quad (8)$$

$$\phi_{Layer_2,TE} = \sum_{n=1}^{5} \frac{b_n}{R^{2n}} \left((x + \Delta D)^2 + \left(y + \frac{\Delta s}{2}\right)^2\right)^n + k_{grat,2} x \quad (9)$$

$$\phi_{Layer_2,TM} = \sum_{n=1}^{5} \frac{b_n}{R^{2n}} \left((x + \Delta D)^2 + \left(y - \frac{\Delta s}{2}\right)^2\right)^n + k_{grat,2} x + \phi_0 + \frac{2\pi}{3} \quad (10)$$

$$\phi_{Layer_2,TE} = \sum_{n=1}^{5} \frac{b_n}{R^{2n}} \left(x^2 + \left(y - \Delta D + \frac{\Delta s}{2}\right)^2\right)^n - k_{grat,2} y \quad (11)$$

$$\phi_{Layer_2,TM} = \sum_{n=1}^{5} \frac{b_n}{R^{2n}} \left(x^2 + \left(y - \Delta D - \frac{\Delta s}{2}\right)^2\right)^n - k_{grat,2} y + \phi_0 + \frac{4\pi}{3} \quad (12)$$

where $b_n$ are the optimized coefficients of the even-order polynomials of the shifted radial coordinates and $k_{grat,2}$ is the linear phase gradient. The detailed information about $b_n$ and $k_{grat,2}$ is given in table (500B) of FIG. 5B. The combinations of (Eqs. 1, 2, 7, and 8), (Eqs. 3, 4, 9, and 10), and (Eqs. 5, 6, 11, and 12) result in the three phase-shifted DIC images in FIG. 5C, $I_1$, $I_2$ and $I_3$, respectively. The desired phase offsets for the three-step phase shifting are achieved by the phase maps of the second metasurface layer in Eqs. 7-12. Moreover, it is pointed out that $I_1$, $I_2$ and $I_3$ in FIG. 5C are comparable to the results shown in FIG. 2C. FIG. 5D shows the PGI calculated from the three DIC images in FIG. 5C by using Eq. (b) presented previously, and is in good agreement with the ideal PGI shown in FIG. 2D.

With reference to FIGS. 4A-4B, and 5D, the phase profiles of the double-sided metasurface layer (400A) are determined by Eqs. 1-12 with the optimized phase profile parameters such as $a_n$, $b_n$, R, $\Delta D$, $\Delta s$, $k_{grat,1}$, and $k_{grat,2}$ given in table (500E) of FIG. 5E.

The invention claimed is:

1. A miniaturized quantitative phase gradient microscope (QPGM) comprising:
a polarization sensitive and beam splitting first metasurface layer including a birefringent first metasurface lens;
a polarization sensitive second metasurface layer including birefringent second metasurface lenses;

wherein:
i) the first metasurface layer is configured to:
receive light from an object,
split the light into plural split light beams travelling in separate directions towards corresponding second birefringent metasurface lenses, each split light beam including a transverse electric polarization and a transverse magnetic polarization, and
ii) the second metasurface layer is configured to:
receive the split light beams at the corresponding second birefringent metasurface lenses, and
form separate phase-shifted differential interference contrast (DIC) images.

2. The miniaturized QPGM of claim 1 wherein the DIC images are formed on an image plane.

3. The miniaturized QPGM of claim 2, wherein the image plane is part of a sensor or camera.

4. The miniaturized QPGM of claim 1, wherein the object is a transparent object.

5. The miniaturized QPGM of claim 1, wherein the birefringent second metasurface lenses are at least three birefringent second metasurface lenses and the plural split light beams are corresponding at least three split light beams.

6. The miniaturized QPGM of claim 1, further including a first polarizer upstream of the first metasurface layer and a second polarizer downstream of the second metasurface layer, wherein:
the first polarizer is configured to polarize light entering the first metasurface layer from the object in combination with the first metasurface layer, and
the second polarizer is configured to polarize light exiting the second metasurface layer when forming the separate phase-shifted DIC images.

7. The miniaturized QPGM of claim 6, wherein the first polarizer is attached to the first metasurface layer and the second polarizer is attached to the second metasurface layer.

8. The QPGM of claim 7, wherein:
the first polarizer is a linear polarizer aligned to +45° with respect to the image plane, and
the second polarizer is a linear polarizer aligned to −45° with respect to the image plane.

9. The miniaturized QPGM of claim 1, wherein one or more of the birefringent first metasurface lens and the birefringent second metasurface lenses comprise nanoposts.

10. The miniaturized QPGM of claim 9, wherein the nanoposts are circularly arranged rectangular nanoposts.

11. The miniaturized QPGM of claim 1, wherein
the first metasurface layer has a transparent first layer substrate and the second metasurface layer has a transparent second layer substrate.

12. The miniaturized QPGM of claim 11, wherein the first layer substrate and the second layer substrate are separate layers.

13. The miniaturized QPGM of claim 11, wherein the first layer substrate and the second layer substrate are a same transparent substrate, the same transparent substrate separating the first metasurface layer from the second metasurface layer.

14. A metasurface-based method of generating a quantitative phase gradient image of an object comprising:
by a first set of one or more metasurfaces, receiving a light beam from an object;
by the first set of one or more metasurfaces, spatially splitting the light beam into plural separate split light beams, each separate split light beam including a transverse electric polarization and a transverse magnetic polarization;

by a second set of plural metasurfaces, forming corresponding phase-shifted differential interference contrast images through the plural separate split light beams, and generating a phase gradient image from the differential interference contrast images.

15. The metasurface-based method of claim 14, further comprising polarizing the light beam in addition to the spatially splitting, wherein the phase-shifted differential interference contrast images are formed through additional polarization of the plural separate split light beams.

16. The metasurface-based method of claim 15, wherein the first set and the second of metasurfaces comprise birefringent metasurface lenses.

17. The metasurface-based method of claim 16, wherein the first set of metasurfaces comprises one birefringent metasurface lens and the second set of metasurfaces comprises three birefringent metasurface lenses.

18. The metasurface-based method of claim 14, wherein the first set and the second set of metasurfaces are separated from and operatively connected to each other through a transparent medium.

19. The metasurface-based method of claim 18, wherein the transparent medium is a common transparent substrate supporting both the first set and the second set of metasurfaces.

20. The metasurface-based method of claim 14, wherein the object is a transparent object.

* * * * *